Patented Jan. 2, 1951

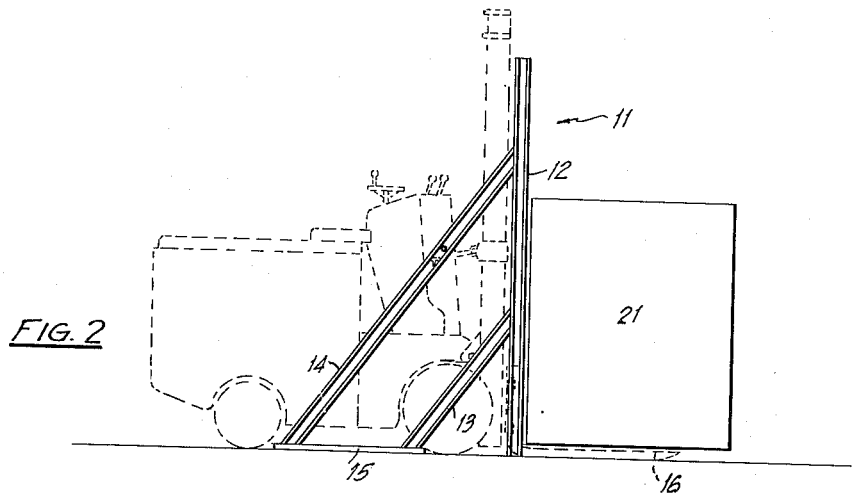
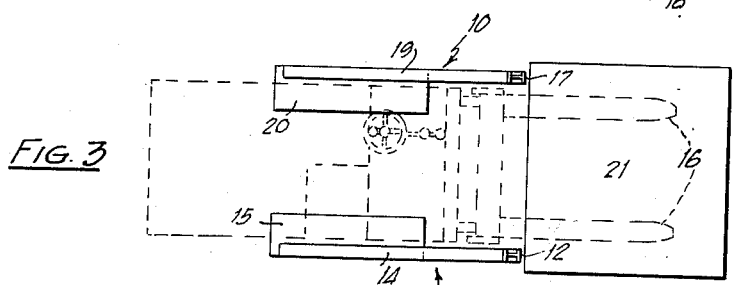
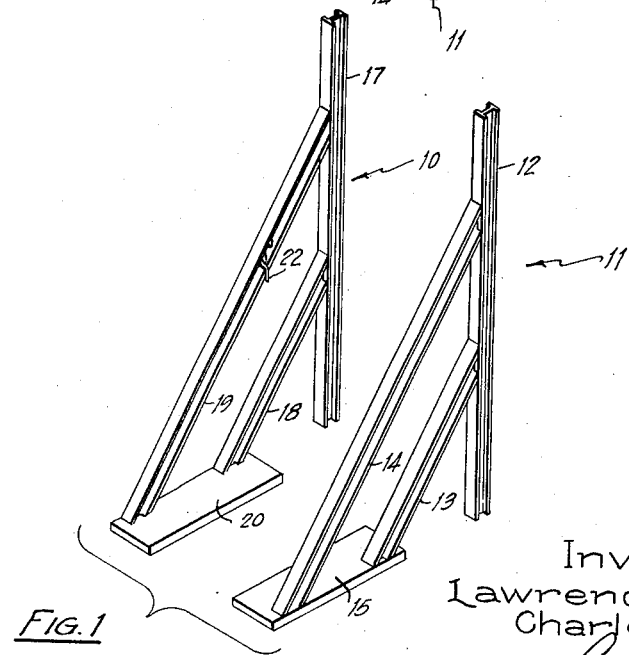

2,536,882

UNITED STATES PATENT OFFICE 2,536,882

UNLOADING DEVICE

Lawrence F. McDonald, East Greenbush, and Charles J. Grace, Slingerlands, N. Y.

Application April 6, 1949, Serial No. 85,813

6 Claims. (Cl. 214—44)

This invention relates to an auxiliary loading device adapted to be used in conjunction with an industrial fork-lift truck for the purpose of loading freight cars with "unit loads" in which a block of containers is fastened together by the use of flat steel or round wire strapping, or by the use of a non-setting "palletizing" glue placed between the containers.

Heretofore, it has been customary to place such loads on conventional type pallets. One such pallet is the well-known hard wood pallet in which cross boards are fastened to the narrow edges of spaced-apart stringers, to provide a raised platform, whereby the fork of a truck can readily pass thereunder to pick up the load together with the pallet. Another type of pallet, perhaps not so well known, is the so-called "expendable" pallet consisting of a sheet of heavy corrugated board to which spirally-wound legs of corrugated board are glued to maintain the same in elevated position, so that the fork of a truck can pass thereunder to pick up the load and the pallet. The use of life trucks and hard wood pallets has produced tremendous savings in the handling of merchandise within an industrial plant or warehouse, but it has not been possible to extend these savings to the shipment of goods in freight cars, nor has the use of expendable pallets solved the problem for the following reasons:

1. Hard wood pallets are too expensive to risk loss in transit and return;
2. The freight rate on such pallets is the same as the goods they carry;
3. The return freight is excessive because the pallets carry a high rate;
4. Expendable pallets are also relatively expensive; and
5. Expendable pallets break down too often in transit.

However, another type of pallet, which we have invented having lifting handles projecting from a marginal edge of a sheet of material, for example, corrugated board, can be utilized to advantage. With such a pallet, the goods need not be maintained in spaced relation with respect to the floor. Such a pallet is lifted to an inclined position by engaging the handles with the fork of the lift truck, blocking it in this position, and passing the fork thereunder to lift the same with the load thereon when the shipment of a unit load reaches the consignee. This type of pallet forms the subject matter of another patent application Serial Number 85,815 filed April 6, 1949 by us concurrently herewith.

A principal object of the invention is the provision of an auxiliary loading device adapted to be used in conjunction with a fork-lift truck which will make it unnecessary to rely on hard wood or expendable pallets of the type above described.

Another object of the invention is the provision of an auxiliary loading device adapted to be used with a fork-lift truck for loading freight cars by removing a load of goods from the fork of the truck and depositing the same in a selected position in the car.

More specifically, it is an object of the invention to provide an auxiliary device comprising right and left brackets which are adapted to be placed adjacent the right and left sides respectively of the truck, and adjacent the goods carried on the fork of the truck, each bracket having a bed plate extending inwardly of the bottom of the truck and aligned behind the front wheels thereof, and on the same level therewith, to support the weight of the truck as it moves rearwardly, whereby the device will be held in fixed position by the truck and the goods swept from the fork by the brackets.

Another object of the invention is the provision of such a device which can be carried by the truck to the point of unloading, detached from the truck, placed adjacent the goods and in cooperative relation with the truck in such a manner that the weight of the truck will hold the device stationary as the truck is moved rearwardly, whereby the goods will be removed from the truck.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Fig. 1 is a perspective view of an auxiliary loading device embodying the invention;

Fig. 2 is an elevational view illustrating the manner in which the device is positioned with respect to a fork-lift truck, shown in dotted line position, and a load of goods carried thereby to be unloaded therefrom; and Fig. 3 is a plan view of the arrangement depicted in Fig. 2.

Referring more particularly to the drawing, left and right brackets are indicated generally at 10 and 11 respectively. The right bracket consists of a vertically disposed member 12, the bottom of which rests on the floor. Cooperatively connected thereto, by struts 13 and 14, is a bed plate 15. This bed plate is held in spaced relation with respect to the bottom of the member 12 and is of a width sufficient to accommodate the driving wheels of a lift truck. Also, the bed plate should be of a length which is at least equal to the fork 16 of the truck.

The left bracket 10 is similar in construction to the right bracket 11, having a vertically disposed member 17 resting on the floor with struts 18 and 19 cooperatively connecting the same to a bed plate 20.

The bed plates 15 and 20, when the brackets are aligned in position, will be directed toward each other. The distance each bed plate 15 and 20 is spaced from the vertical members 12 and 17 respectively is sufficient to permit them to be placed behind the front wheels of the truck without interfering therewith.

When the truck picks up a load of goods 21, which may be either a "unit load," secured together as above described, or a case or container, it is deposited in a selected position in the freight car by the operator of the truck. An assistant places the brackets in the position shown in the drawing. These brackets preferably are of lightweight material, such as aluminum or magnesium metal, and may easily be handled.

As shown in the drawing, the right bracket 11 is placed adjacent the right side of the truck in such a manner that the bed plate 15 is directed inwardly thereof and aligned with the rear of the right front driving wheel. The vertical member 12 will rest adjacent the load on the fork of the truck. The left hand bracket 10 is similarly placed adjacent the left side of the truck with the bed plate 20 in alignment with the left front driving wheel. The vertical member 17 also will rest adjacent the load on the fork of the truck.

When the truck is moved rearwardly, the driving wheels will pass over the bed plates 15 and 20. The weight of the truck will hold the brackets in fixed position. As the truck continues to move rearwardly, the vertical members 12 and 17 will abut the load 21 in such a manner that the load will be swept off the fork 16 and deposited, with its pallet, in the selected position. In other words, the goods are brought to the selected position, the fork of the truck withdrawn from underneath the goods, and the goods permitted to settle on the floor in the selected position.

It is necessary that the bed plates be at least equal in length to the length of the fork so that the weight of the truck will at all times hold the brackets in position while the load 21 is still being carried by the fork 16. Since conventional lift trucks utilize a single rear steering wheel centrally disposed, there will be no interference with the bed plates. Where two rear steering wheels are used, they can be properly spaced to prevent interference with the bed plates.

Very often, in loading a car, it is necessary to deposit a load in such a manner in a corner that it might be difficult for a helper to place the brackets in position because of the adjacent wall of the car. For this reason, the brackets may be equipped with hooks 22 so that the bracket can be hooked in an opening provided in the side of the truck. The bracket then can be maneuvered closely adjacent the wall of the car by means of the truck. When the truck has placed the goods in the selected position for deposit, the operator unhooks the bracket and places it in the desired position with respect to the truck and the goods as above described. In fact, both brackets can be carried on the side of the truck and utilized by the operator in this manner when necessary.

While the present invention is designed primarily for use in loading freight cars, it is not necessarily limited to such use. It will be obvious that the device can be used with equal facility in industrial plants, or warehouses.

The upright members and struts may also be of any suitable configuration and are not necessarily confined to the I-beam type shown in the drawing.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. An auxiliary device for a fork-lift truck, adapted for use in loading freight cars by removing a load of goods from the fork of the truck, and depositing the goods in a selected position in said car, which comprises substantially vertical means adapted to be placed adjacent a side of said truck in substantially abutting relation with respect to said goods carried on said fork, and means cooperatively connected with said first means, adapted to be positioned behind a front wheel of said truck on the same level therewith and extending rearwardly thereof in the path of the wheel to support the weight of said truck as it is moved rearwardly, whereby said device will be held in fixed position by the truck and the goods swept from said fork by said vertical means.

2. An auxiliary device for a fork-lift truck, adapted for use in loading freight cars by removing a load of goods from the fork of the truck, and depositing the goods in a selected position in said car, which comprises substantially vertical members adapted to be placed adjacent each side of said truck and in substantially abutting relation with respect to said goods carried on said fork, and base plates cooperatively connected with said vertical members adapted to be positioned behind the front wheels of said truck on the same level therewith and extending rearwardly thereof in the path of said wheels to carry the weight of the truck as it is moved rearwardly, whereby said device will be held in fixed position by the truck and the goods swept from said fork by said vertical members.

3. An auxiliary device for a fork-lift truck, adapted for use in loading freight cars by removing a unit load of goods from the fork of the truck, and depositing the goods in a selected position in said car, which comprises a pair of substantially vertical braces adapted to be placed adjacent opposite sides of said truck and adjacent the goods carried on said fork, and means cooperatively connected with said braces adapted to be positioned behind the front wheels of said truck on the same level therewith and in the path of the wheels to support the weight of the truck as it moves rearwardly, whereby said device will be held in fixed position by the truck and the goods swept from said fork by said vertical braces.

4. An auxiliary device for a fork-lift truck, adapted for use in loading freight cars by removing a load of goods from the fork of the truck, and depositing the goods in a selected position in said car, which comprises substantially vertical means adapted to be placed adjacent a side of said truck in substantially abutting relation with respect to said goods carried on said fork, and a base plate connected to said means, which plate is at least equal to the length of said fork, and adapted to be placed behind a front wheel of said truck on the same level therewith and in the path thereof to support the weight of the truck as it moves rearwardly, whereby said device will be held in fixed position by the truck and the goods swept from said fork by said vertical means.

5. An auxiliary device for a fork-lift truck, adapted for use in loading freight cars by removing a load of goods from the fork of the truck, and depositing the goods in a selected position in said car, which comprises right and left vertical brackets which are adapted to be placed adjacent the right and left sides respectively of said truck and adjacent the goods carried on said fork, the brackets each having means extending inwardly of the bottom of the truck and aligned behind the front wheels thereof, and on the same level therewith, to support the weight of the truck as it moves rearwardly, whereby said device will be held in fixed position by the truck and the goods swept from said fork by said brackets.

6. An auxiliary device for a fork-lift truck, adapted for use in loading freight cars by removing a load of goods from the fork of the truck, and depositing the goods in a selected position in said car, which comprises truck-unloading brackets having substantially vertical bracing members adapted removably to be carried on each side of said truck, said brackets being adapted, when disengaged from said truck, to be placed with said members in abutting relation with said goods carried on said fork, and a base plate cooperatively connected in spaced relation with respect to each of said bracing members, said plates being adapted to be positioned behind the front wheels of said truck on the same level therewith and extending rearwardly thereof in the path of the wheels to carry the weight of said truck as it is moved rearwardly, whereby said device will be held in fixed position by the truck and the goods swept from said fork by said vertical bracing members.

LAWRENCE F. McDONALD.
CHARLES J. GRACE.

No references cited.